United States Patent [19]

Haskell et al.

[11] Patent Number: 5,687,095

[45] Date of Patent: Nov. 11, 1997

[54] VIDEO TRANSMISSION RATE MATCHING FOR MULTIMEDIA COMMUNICATION SYSTEMS

[75] Inventors: Barin Geoffry Haskell, Tinton Falls; Li Yan, Holmdel, both of N.J.

[73] Assignee: Lucent Technologies Inc., Murray Hill, N.J.

[21] Appl. No.: 332,984

[22] Filed: Nov. 1, 1994

[51] Int. Cl.⁶ .............................. H04N 7/58; H04N 5/00
[52] U.S. Cl. ...................... 364/514 A; 348/387; 348/390
[58] Field of Search ...................... 364/514 A; 348/390, 348/387, 394, 395, 397, 403, 411, 413, 412, 414, 415, 416, 417, 418

[56] References Cited

U.S. PATENT DOCUMENTS

| | | | |
|---|---|---|---|
| 5,134,476 | 7/1992 | Aravind et al. | 358/133 |
| 5,159,447 | 10/1992 | Haskell et al. | 358/133 |
| 5,452,006 | 9/1995 | Auld | 348/390 |
| 5,534,937 | 7/1996 | Zhu et al. | 348/466 |
| 5,534,944 | 7/1996 | Egawa et al. | 348/584 |

OTHER PUBLICATIONS

Reibman et al., "Constraints on Variable Bit-Rate Video for ATM Networks", IEEE, pp. 361–372, 1992.

Haskell et al., "Multiplexing of Variable Rate Encoded Streams", IEEE, pp. 417–424. 1994.

"Reduction of the Bit-Rate of Compressed Video While In Its Coded Form", D. G. Morrison et al., Sixth International Workshop on Packet Video, Portland, Oregon, USA, 26–27 Sep. 1994.

"Continuous Presence Video Bridging Based on H.261 Standard" by Ting-chung Chen, et al., SPIE Vo. 2094, pp. 269–280.

"Understanding Personal Conferencing –PC Power: One-o-n–One Communications", product brochure from Intel Corporation, 1994.

"Desktop Data Conferencing" by Andrew W. Davis, Byte, May 1994 pp. 81–86.

"Voiceband Data Transmission Interface Generic Requirements", Bellcore Technical Advisory, TA–NWT–000030, Issue 3, Apr., 1992.

"Class Feature: Calling Number Delivery" FSD 01–02–1051, Bellcore Technical Reference TR–TSY–000031, Issue 3, Jan., 1990.

"Continuous Presence for H.320 Multipoint Conferences", PitureTel Corporation Committee T1 Contribution, Nov. 4, 1993.

"Description of Ref. Model 8 (RM8)", Specialist Group on Coding for Visual Telephony, CCITT SGXV Working Party XV/r, Document 525, 1989.

"Draft Revised Recommendation H.261 –Video Codec For Audiovisual Services at px 64 kbits/s Submitted to the Xth CCITT Plenary Assembly", Study Group XV –Report R 95, International Telegraph and Telephone Consultative Committee (CCITT) Period 1989–1992, COM XV–R 95–E, May 1992.

(List continued on next page.)

*Primary Examiner*—Emanuel T. Voeltz
*Assistant Examiner*—Patrick Assouad
*Attorney, Agent, or Firm*—Steven R. Bartholomew

[57] ABSTRACT

Digital video transmission rate matching techniques are disclosed. A bit stream rate matching apparatus includes a bit rate increasing device and a bit rate reducing device. The bit rate increasing device converts a video bit stream having a first transmission rate to a video bit stream having a second transmission rate wherein the first transmission rate is less than the second transmission rate. The bit rate reducing device converts a video bit stream having the second transmission rate to a video bit stream having the first transmission rate. The bit stream rate matching apparatus is useful in the context of a multimedia conference where a first endpoint device employs the first transmission rate and a second endpoint device employs the second transmission rate.

11 Claims, 6 Drawing Sheets

OTHER PUBLICATIONS

"Multipoint Control Units for Audiovisual Systems Using Digital Channels Up to 2 Mbit/s", International Telecommunication Union, Telecommunication Standardization Sector of ITU, ITU–T Recommendation H.231 (Previously CCITT Recommendation) Mar., 1993.

"Procedures for Establishing Communication Between Three or More Audiovisual Terminals Using Digital Channels Up to 2 Mbit/s", International Telecommunication Union, Telecommunication Standardization Sector of ITU, ITU–T Recommendation H.243 (Previously CCITT Recommendation). Mar. 1993.

GROUP 506, GROUP 508, GROUP 507 labeled on an 8×8 zigzag-ordered coefficient block (DC, A1–A63).

FIG. 6

- START
- INITIALIZATION — 600
- MACRO BLOCK PROCESSING — 601
- MACRO BLOCK PARAMETER UPDATING — 602
- MACRO BLOCK COUNTING: DOES MBLK# > MBLK#_MAX ? — 603 (NO → loop back)
- FRAME PARAMETER UPDATING — 604
- ARE THERE MORE FRAMES ? — 605 (YES → loop; NO → END)

VIDEO TRANSMISSION RATE MATCHING FOR MULTIMEDIA COMMUNICATION SYSTEMS

CROSS-REFERENCE TO RELATED APPLICATION

Related subject matter is disclosed in the co-pending commonly assigned U.S. patent application of: Yan et al., entitled "Coded Domain Picture Composition for Multimedia Communications Systems" Ser. No. 08/332,985 and filed simultaneously herewith.

BACKGROUND OF THE INVENTION

1. Field of the Invention

The invention relates generally to multimedia communication systems which utilize endpoint devices, and more specifically to techniques for matching the video transmission rates of a plurality of endpoint devices.

2. Description of the Prior Art

Video transmission rate matching is a technique which has been used to convert the bit rate of a first video bit stream to match that of a second video bit stream. This conversion may require bit rate reduction and/or bit rate increases. Among these two conversion processes, bit rate reduction is more critical, due to the fact that this process involves the removal of bits. Since these bits represent video information, the quality of a video signal having a reduced bit rate may be degraded. The amount of degradation is related to the manner in which the bit rate reduction is achieved.

With respect to bit rate increases, no information is removed from the video bit stream. Instead, such a rate increase requires the incorporation of additional bits into the bit stream. Although it would be desirable to add bits to the bit stream for the purpose of enhancing the video signal, such enhancements are often in the pel domain. For example, if an incoming video signal has been subjected to a process of data compression, the information discarded in the compression process is not stored. The information is lost, and cannot be recovered and added to the bit stream during the process of increasing the bit rate. Therefore, bit rate increases are implemented by adding "extra" bits to the bit stream, wherein these "extra" bits are not the same bits that may have been removed during a previous data compression step. Bits are added using conventional bit-stuffing patterns to occupy the additional bandwidth of a rate-increased video signal.

Video transmission rate matching has been applied to a wide variety of applications in the field of multimedia communication, especially in environments involving multipoint communication topologies. For example, in multimedia conferencing applications, a "bridge" or "multipoint control unit" (MCU) is typically employed. This MCU is a computer-controlled device which includes a multiplicity of communication ports. The ports may be selectively interconnected in a variety of ways to provide communication among a group of endpoint devices. MCUs are often used to establish multi-party conferences among a plurality of endpoint devices, and to establish multi-party conference calls. A state-of-the-art MCU is described in ITU Document H.243, "Procedures for Establishing Communication Between Three or More Audiovisual Terminals Using Digital Channels up to 2 Mbps", March 1993, and in ITU Document H.231, "Multipoint Control Units for Audiovisual systems Using Digital Channels up to 2 Mbps", March 1993.

Existing MCUs require all endpoint devices participating in a given multimedia conference to use the same video transmission rate. Typically, during the initial setting up of a multimedia conference, or at the time that it is desired to add an additional endpoint device to an existing conference, the MCU polls all of the endpoint devices to ascertain the video transmission rate or rates each endpoint device is equipped to implement. When the MCU polls a given endpoint device, the endpoint device transmits a capability code back to the MCU. The capability code includes information specifying the video bit rate transmission capabilities, audio bit rate transmission capabilities, etc., of a given endpoint device. These capability codes may also specify the compression algorithm or algorithms used by a given endpoint device.

Based upon the capability codes received by the MCU from the various endpoint devices, the MCU selects a minimum video bit rate to be used as the video transfer rate for the multimedia conference. The MCU sends a video rate signal to all endpoint devices which specifies use of this video transfer rate. Upon receipt of the video rate signal, the endpoint devices all operate using the same video transfer rate.

Use of the same video transfer rate for all endpoint devices participating in a given conference presents significant shortcomings. For example, in many cases, a conference participant may desire to receive high-quality video by using a relatively high video transfer rate, whereas other participants may want to use less expensive equipment offering a lower video transfer rate. State-of-the-art MCUs cannot implement a multimedia conference using a plurality of different video transfer rates. Therefore, it would be desirable to equip existing MCUs with a video transmission rate matching device. Through the use of video transmission rate matching techniques, video communication among a plurality of endpoint devices will be provided, even when the endpoint devices use different video transmission rates.

One video transmission rate matching method well-known to those skilled in the art is termed the transcoding method. Pursuant to the transcoding method, a compressed video bit stream having a first bit rate is fully decoded into a video space known as the pel domain. This fully-decoded bit stream, which may be conceptualized as a completely reconstructed video sequence, is then encoded into a video bit stream having a second bit rate.

The existing transcoding method is disadvantageous. Since decoding as well as encoding processes are required, transcoding is very time-consuming. As a practical matter, the time delay is at least twice that of the end-to-end encoding delay. Such a delay is not tolerable for applications requiring real-time communication, such as multimedia conferencing. A faster method of performing video bit rate matching is needed.

SUMMARY OF THE INVENTION

Digital video transmission rate matching techniques are disclosed. A bit stream rate matching apparatus includes a bit rate increasing device, a bit rate reducing device, and first and second switching devices. The first switching device switches each of a plurality of incoming video bit streams to any one of the bit rate increasing device, the bit rate reducing device, and the second switching device. Each of these incoming video bit streams originates from a particular endpoint device. The second switching device switches video bit streams from the bit rate reducing device, the bit rate increasing device, and the first switching device to each of a plurality of outgoing video bit streams. The first and second switching devices are controlled by a processor. The bit stream rate matching apparatus is useful in the context of a video communication where a first endpoint device employs the first transmission rate and a second endpoint device employs the second transmission rate.

DETAILED DESCRIPTION

For illustrative purposes, video transmission rate matching will be described in the operational context of an H.261 environment. However, it is to be understood that the video transmission rate matching techniques described herein are generally applicable to any video compression algorithm which uses transformation and quantization processes. For example, the techniques disclosed herein may be employed in conjunction with video telephones of the type described in CCITT recommendation COST 211. However, for purposes of the present disclosure, video data to and/or from the video transmission rate matching system will be compressed in an H.261-like format.

An "H.261-like" format is any coding format which is similar to the coding format currently being established by the International Telecommunications Union (ITU-T). The format is described in the ITU-T document "Recommendation H.261, Video Codec for Audiovisual Services at px64 kbits/s", May 1992, and the ITU-T document "Description of Reference Model 8", Jun. 9, 1989.

Figure 1:
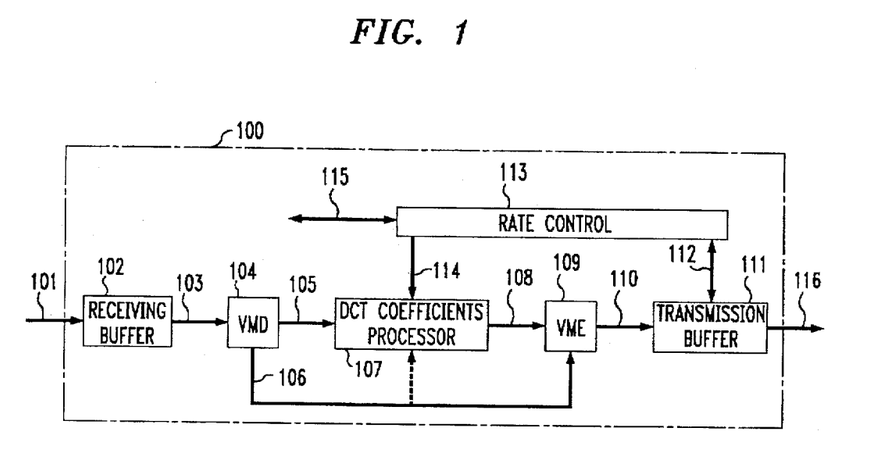
FIG. 1 is a hardware block diagram of a video transmission rate reduction apparatus according to a preferred embodiment disclosed herein.

FIG. 1 is a hardware block diagram showing a transmission rate reduction system 100 for a video signal which has been compressed in an H.261-like format. The transmission rate reduction system 100 includes an input port 101 for accepting a compressed video signal having a first bit transmission rate and an output port 116 for providing a compressed video signal having a second bit transmission rate. A compressed video signal is defined as the binary representation of a video signal which has been compressed by a coding algorithm substantially similar to that described in the H.261 standard, and then coded according to a syntax substantially similar to that described in the H.261 standard.

A compressed video signal in the form of a digital, coded bit stream is presented to input port 101. This compressed video signal includes coded digitized video information along with a header. The header may include the types of information specified in the H.261 standard, and/or other types of information such as the source, the destination, the content, and/or the organization of the video information.

Input port 101 is connected to a receiving buffer 102, which is a conventional digital buffer. This receiving buffer 102 provides electrical isolation between the source of the compressed video signal and the various circuit elements shown in FIG. 1.

The output of the receiving buffer 102 is coupled to a video multiplex decoder (VMD) 104. VMD 104 includes the combination of a decoder and a demultiplexer. The demultiplexer is equipped to demultiplex the coded bit stream. The decoder decodes header information which has been coded into the aforementioned coded bit stream. The demultiplexer and decoder perform the function of recovering compressed video data from the coded bit stream.

The VMD 104 includes a first output port 105 and a second output port 106. The VMD 104 provides the first output port 105 with quantized DCT coefficients along with quantization information. The nature of these DCT coefficients is described in greater detail in the H.261 standard. The second output port 106 is provided with motion vectors. First output port 105 is coupled to DCT coefficients processor 107, and second output port 106 is coupled to a video multiplex encoder (VME) 109. The operation and structure of VME 109 will be described in greater detail below. The motion vectors are sent directly from VMD 104 to VME 109 because no motion estimation is employed in the present example.

The DCT coefficients received from the first output 105 of VMD 104 are sent to DCT coefficients processor 107. The DCT coefficients processor 107 processes the DCT coefficients in such a manner that the output 108 of DCT processor 107 is a signal which requires fewer bits to encode than the number of bits which were received from the first output 105 of the VMD 104. The DCT coefficients processor 107 reduces the number of bits such that the resulting video quality is not substantially degraded as perceived by human visual processes. In other words, the video quality is degraded "gracefully". The amount of information reduced by processing coefficients at DCT coefficients processor 107 is controlled by the rate-control signal 114 sent by rate control unit 113. Various techniques for programming DCT coefficients processor 107 to degrade video quality gracefully are well known to those skilled in the art. Three such techniques for gracefully degrading video quality will be discussed in greater detail hereinafter.

The processed DCT coefficients are produced at the output 108 of DCT coefficients processor 107. These processed DCT coefficients, together with the motion vectors 106 produced at the second output of VMD 104, are sent to the video multiplexing encoder (VME) 109 to form a new video bit stream substantially conforming to the H.261 standard. The VME 109 encodes the processed DCT coefficients and motion vectors, and multiplexes them into the layered data structures shown in FIG. 3, to be described in greater detail hereinafter. The new coded bit stream, produced at the output 110 of VME 109, is sent to a transmission buffer 111.

As it is well-known that compressed video data signals may include a plurality of components, wherein each component may be represented by a different number of bits, transmission buffer 111 performs a variable-rate to constant-rate translation for the compressed video. The transmission buffer 111 includes circuitry to ascertain and to indicate the status of the transmission buffer 111, which is defined as the occupancy ratio of the memory locations within the transmission buffer 111. The occupancy ratio refers to the ratio between the number of occupied memory locations within a given buffer and the total number of memory locations within this buffer. The buffer status is produced at a first input/output 112 of the transmission buffer 111. This first output 112 is coupled to a rate control 113 circuit. This rate control 113 circuit adjusts the average data rate provided by the DCT coefficients processor 107.

Figure 9:
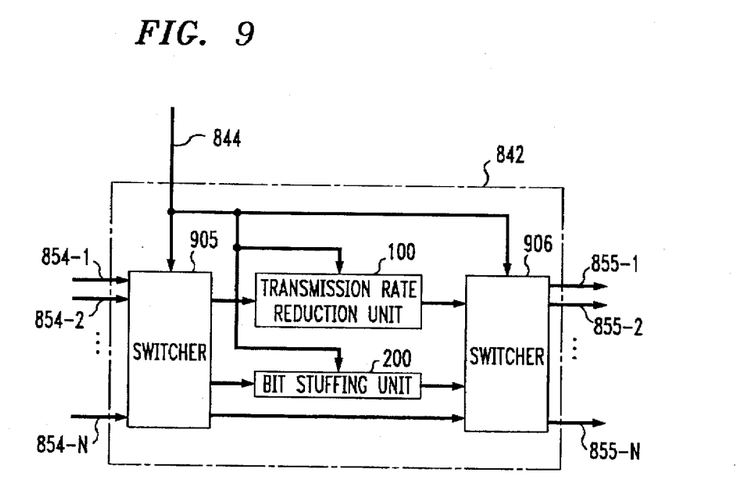
FIG. 9 is a block diagram showing an illustrative hardware configuration for the video processor of FIG. 8.

Rate control 113 circuit and DCT coefficients processor 107 are coupled together via signal line 114. The rate control 113 circuit includes a first communications line 115 adapted for receiving a signal, (for example, from a control processor) which specifies a desired output bit rate for transmission buffer 111. The communications line 115 is also adapted to transmit signals to control processor 840 (FIG. 9). The desired output rate signal is processed by rate control circuit 113 in conjunction with the buffer status signal received at the first input/output 112, to generate a rate control output signal which is downloaded via signal line 114 to DCT coefficients processor 107. Based upon the desired output rate signal and the buffer status signal, the rate control 113 circuitry computes the total number of bits for each frame, as well as the bits targeted for each macro block. The targeted bits per macro block or bits per frame are used as reference to produce a proper control signal, which is applied to a second input 114 of the DCT coefficients processor 107. The function of the second input 114 is to force the DCT coefficients processor 107 to operate in such a manner that the bits produced for each macro block are as close to the targeted bits per macro block as possible. The type of signal applied to second input 114 is dependent upon the specific type of DCT coefficients processor 107 which is utilized.

DCT coefficients processor 107 is the processing unit where the DCT coefficients recovered from the VMD 104 are further processed in order to match a desired (i.e., target) output video rate. Three methods can be used to process the DCT coefficients to reduce the total number of bits. Each of these methods provides for the graceful degradation of video quality, as was discussed above. The first method is termed DCT coefficients zeroing, the second method is called the requantization of the DCT coefficients, and the third method consists of the combination of the first and second methods. In the first method, DCT coefficients are partitioned into groups based upon the relative importance of the various coefficents. Due to the fact that DCT coefficients are generally organized into two-dimensional arrays wherein the array entries which are relatively close to the upper left-hand corner of the array include relatively low-frequency components, as compared with array entries which are relatively close to the lower right-hand corner of the array, the relative importance of various DCT coefficients is known. The lower frequency components are more important and the higher frequency components are less important. Based upon the output produced by rate control 113 circuit on signal line 114, the coefficients of the least important group are set to zeroes. Here, the control signal on signal line 114 consists of a digital representation of the indices of a plurality of specific importance groups, or simply indices of the DCT coefficients within a macro block, whose coefficients will subsequently be set to zeroes. By forcing some DCT coefficients to zero, the amount of data produced by the DCT coefficients processor 107 can be properly controlled by rate control 113 circuit.

Figure 2:
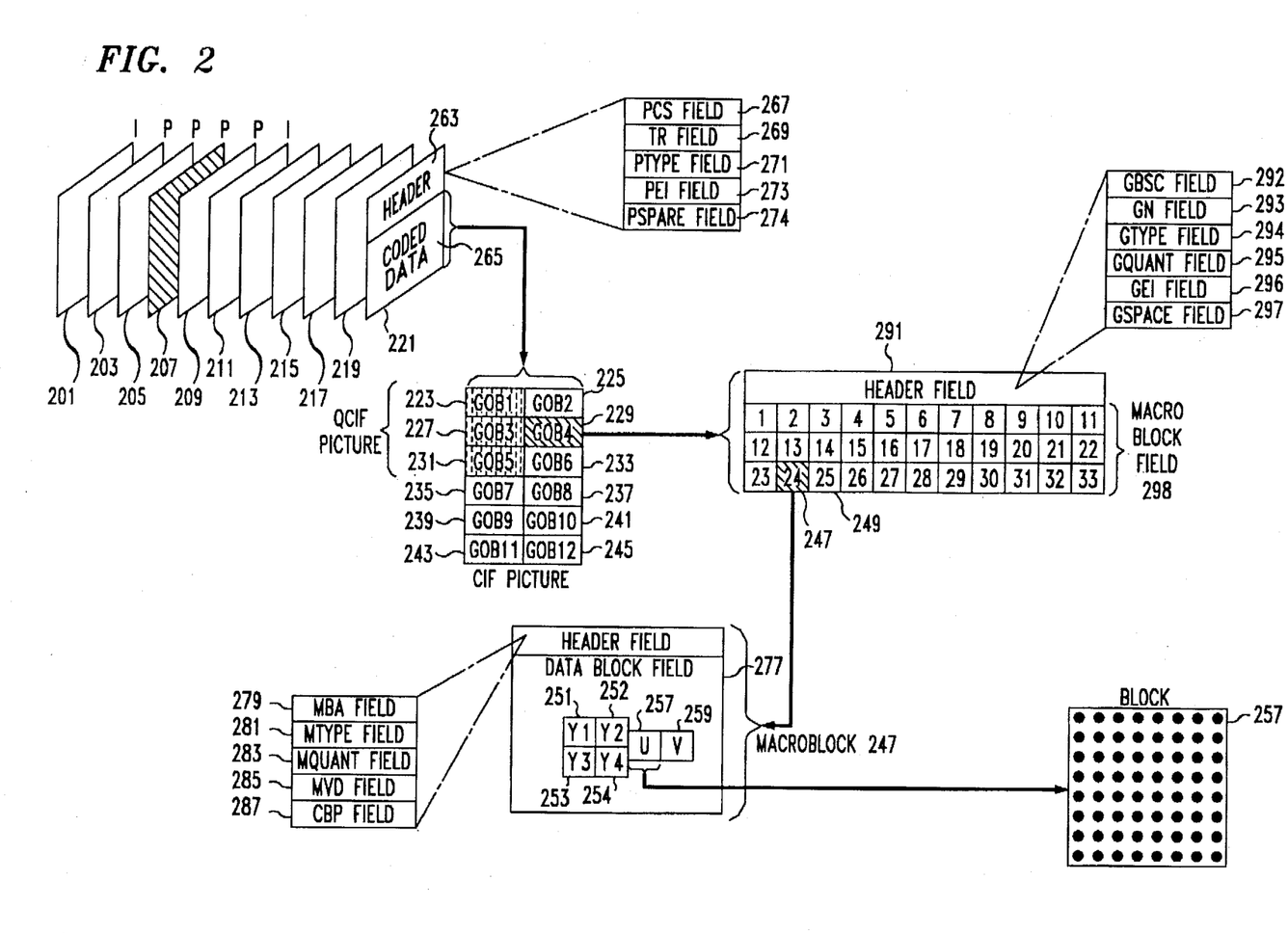
FIGS. 2 and 3 are data structure diagrams setting forth illustrative coding formats for representing video information.
Figure 3:
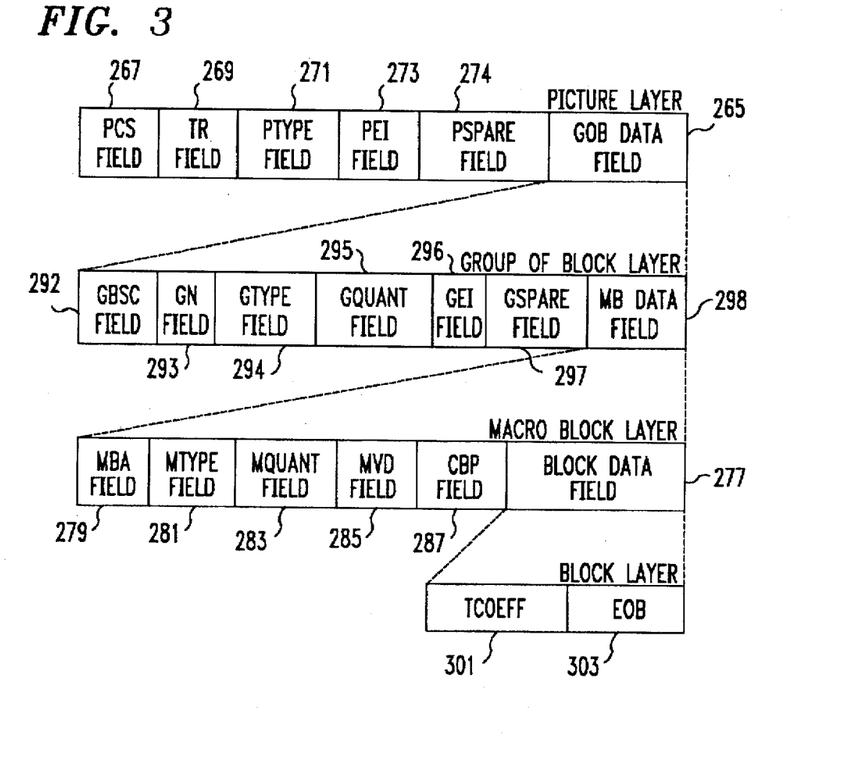

FIGS. 2 and 3 are data structure diagrams setting forth illustrative coding formats for representing video information in accordance with the H.261 standard. Referring now to FIG. 2, video information consists of a plurality of frames 201, 203, 205, 207, 209, 211, 213, 215, 217, 219, 221. Each of these frames contains a a representation of a two-dimensional video image in the form of a pixel array. Since a given frame may represent a video image at a specific moment in time, a plurality of frames may be employed to represent a moving image. Each frame represents a picture. A plurality of frames represents a coded video sequence.

Each of the frames is compressed according to any one of two types of compression algorithms, termed intra-frame coding (I) and predictive coding (P). For example, frames 201 and 211 are compressed using intra-frame coding (I), and frames 203, 205, 207, 209, 213, 215, 217, 219, and 221 are compressed using predictive coding. The sequence of frames shown in FIG. 2 establish a data structure for representing a video image in the form of an encoded video sequence having a plurality of levels arranged in a two-dimensional array, wherein each level represents the value of a pixel element. This encoded video sequence may be termed a coded video bit stream.

If intra-frame coding (I) is to be applied to a given frame, such as frame 201, the frame is termed an I-designated frame, and if predictive coding (P) is to be applied to a given frame, such as frame 205, the frame is termed a P-designated frame.

Pursuant to intra-frame coding (I) compression processes, the I-designated frame 201 is divided into a plurality of pixel blocks, wherein each block consists of an array of 8×8 pixels. Next, a discrete cosine transform (hereinafter, DCT), is performed on each of the pixels in the 8×8 pixel block, in accordance with procedures well-known to those skilled in the art, to generate a plurality of DCT coefficients. Thereafter, quantization is performed on the DCT coefficients, in accordance with well-known quantization procedures. These quantized DCT coefficients constitute compressed video image information for the I-encoded frame 201.

Predictive coding (P) is implemented on a P-designated frame, such as frame 205, by: 1) partitioning the P-designated frame into a plurality of macro blocks. For example, if the frame includes a plurality of pixel arrays, each having 16×16 pixels (FIG. 2, 251, 252, 253, 254, 257, 258), each 16×16 pixel array may be partitioned into 4 contiguous blocks, wherein each block is an 8×8 pixel array; a 16×16 pixel array (luminance) together with an 8×8 pixel block (chrominance) and an 8×8 pixel block (chrominance), comprises a macro block 247; 2) for each of the macro blocks (16×16 pixels) created in step (1), searching the most recent previously occurring frame (which could be either a P- or an I-designated frame, but in the present example is frame 203) for the macro block which contains image information that is most similar to the image information in the macro block created in step (1); 3) generating motion vectors to spatially translate the macro block found in the prior I or P frame in step (2) to the location of the similar macro block in the P frame presently being compressed; 4) generating a predicted frame from the most recent previously occurring frame using the motion vectors; 5) on a macro-block-by-macro-block basis, subtracting the predicted frame from the P-frame being compressed, to generate blocks of residues; 6) performing DCT's on the blocks of residues; 7) quantizing the coefficients of the blocks of transformed residues; and 8) concatenating the quantized residue coefficients and the motion vectors to form a compressed video signal.

In an intra-frame coded (I) picture, every macro block is intra-coded. That is, each macro block is coded without referring to any macro block in the previous I-or P-frame. In the predictive-coded (P) picture, the macro block can be either intra-coded or inter-coded.

To form the coded video bit stream for transmission, the compressed image information, as well as other information such as motion vectors, are coded using specified code words. The code words are then multiplexed into a layered data structure to form the final bit stream. In an H.261-like environment, the coded bit stream is organized into a hierarchical format, the structure of which is illustrated in FIG. 3.

Referring to FIG. 2, the sequence of frames 201, 203, 205, 207, 209, 211, 213, 215, 217, 219, 221 forms a coded video bit stream. This bit stream may be conceptualized as a serial representation of coded frames which can be processed to form a moving video image (i.e., a moving picture). A typical sequence of frames is IPPP . . . PIPPP, where I indicates an intra-coded frame, and P designates a predictive-coded frame. For each frame 221, the coded bit stream representing the frame includes a header 263 and coded data 265. Each header 263 includes a start code and data related to the respective frame (i.e., picture). In an H.261 system environment, much of the header information is required for synchronization purposes. For example, at the frame (picture) layer for frame 221, header 263 includes a picture start code (PCS) field 267, a picture number (TR) field 269, a picture type (PTYPE) field 271, a PEI field 273, and a PSPARE field 274. The PEI field 273 and the PSPARE field 274 are adapted to accommodate extra information which may be required for future applications.

Picture data is segmented into Groups or Blocks (GOB) 223, 225, 227, 229, 231, 233, 235, 237, 239, 241, 243, and 245. A GOB (for example, GOB 229) comprises one-twelfth of the coded frame (CIF) 221. Therefore, GOB 229 may be conceptualized as including one-third of one quarter of a coded picture area. The area represented by one-quarter of a coded picture is abbreviated as QCIF. Accordingly, there are 12 GOBs 223, 225, 227, 229, 231, 233, 235, 237, 239, 241, 243, 245 in a CIF frame 221, and three GOBs in a QCIF frame. The arrangements of GOBs in a CIF/QCIF picture are depicted in FIGS. 2 and 3.

Each GOB 229 includes a header field 291, followed by a macro block data field 298. The header field 291 includes a GOB start code (GBSC) field 292, a group number (GN) field 293, a group type (GTYPE) field 294, a GOB quantizer (GQUANT) field 295, and spare information fields in the form of GEI field 296 and GSPARE field 297. Each GOB 229 consists of 33 macro blocks, such as "macro block 24" (reference numeral 247) and "macro block 25" (reference numeral 249). The arrangement of macro blocks within a GOB is depicted in FIG. 2.

Each macro block includes a header field 275 followed by a block data field 277. The header field 275 includes a macro block address (MBA) field 279, a block type information (MTYPE) field 281, a quantizer type (MQUANT) field 283, a motion vector (MVD) field 285, and a coded block pattern (CBP) field 287. The block data field 277 of each macro block 247 consists of 6 blocks, including four luminance blocks Y1 (reference numeral 251), Y2 (reference numeral 252), Y3 (reference numeral 253), Y4 (reference numeral 254), one chrominance block U (reference numeral 257), and one chrominance block V (reference numeral 259). An illustrative example of the contents of luminance block U (reference numeral 257) is set forth in FIG. 2. Note that this block includes an 8×8 pixel array wherein all pixels have a luminance value of black.

Figure 4:
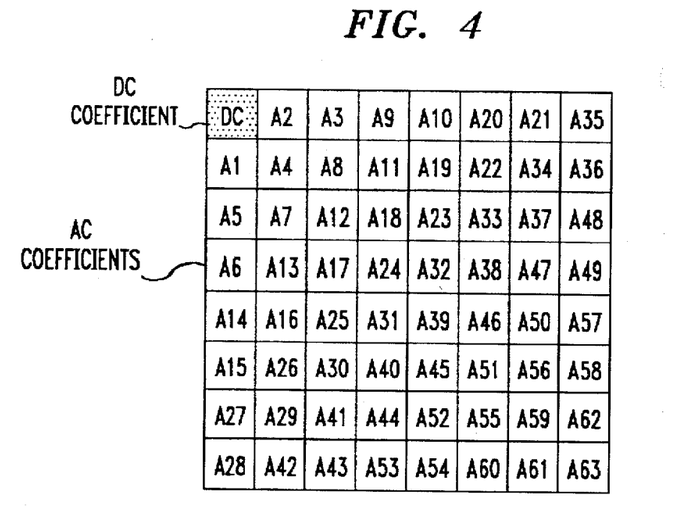
FIG. 4 is a data structure diagram illustrating the arrangement of DCT coefficients within one of the blocks shown in FIG. 3.

A block represents a matrix (array) of pixels, e.g., 8×8, over which a discrete cosine transform (DCT) is performed. The array of pixels is represented by a matrix of pixel array coefficients, including a DC coefficient and a plurality of AC coefficients. The transformed coefficients (TCOEFF) 301 (FIG. 3) consists of a DCT DC coefficient occurring first, followed by respective pixel array coefficients (AC), in the order of their relative importance. The arrangement of DC and AC coefficients in an illustrative block data field 277 (FIG. 3) is shown in FIG. 4. The block data field 277 (FIG. 3) consists of the transformed coefficients (TCOEFF) 301 and an end of block code (EOB) 303 which is appended at the end of each successively occurring block of data.

Figure 5:
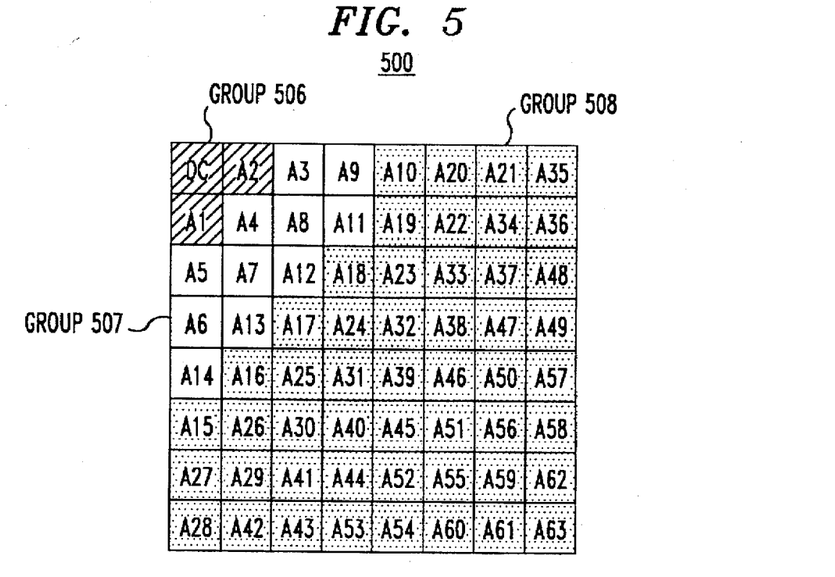
FIG. 5 is a data structure diagram setting forth an illustrative example of DCT coefficient partitioning.

A typical partitioning of DCT coefficients is illustrated in FIG. 5. The DCT coefficients are arranged in a two-dimensional array 500 stored in block data field 277 (FIG. 3). The two-dimensional array 500 (FIG. 5) includes eight rows and eight columns. Each entry in the array corresponds to a specific entry group, such as Group 506, Group 507, or Group 508. The groups are based upon the relative importance of the entries contained therein. Each group includes entries conforming to a specific range of importance levels. These importance levels relate to the relative extent to which the elimination of a particular entry would degrade the quality of the overall video image in a given frame. In the example of FIG. 5, Group 506 is the most important group, and includes entries having a relatively high level of importance. Group 507 includes entries having an intermediate level of importance, and Group 508 includes entries having the least importance to the overall quality of the video image.

Figure 6:
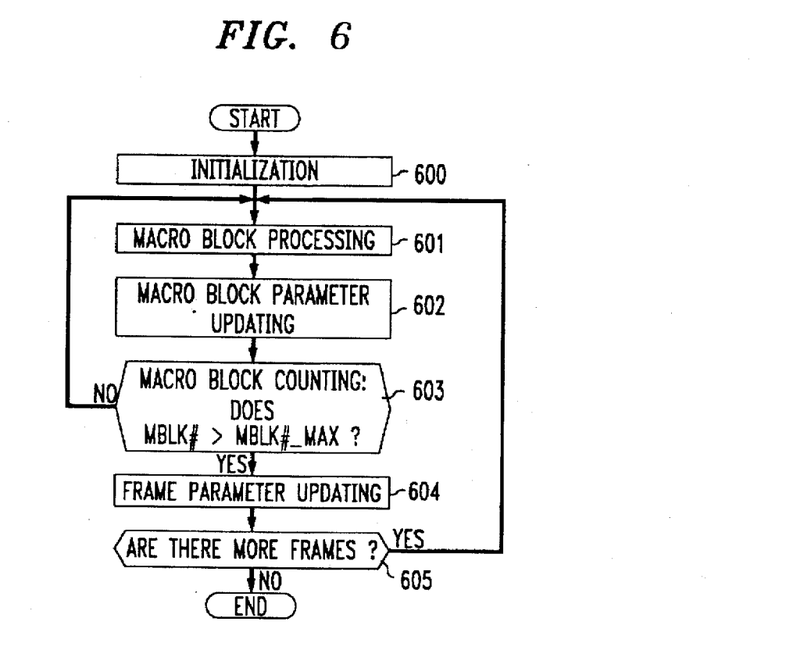
FIG. 6 is a software flowchart setting forth a procedure for performing video bit rate matching according to a preferred embodiment disclosed herein.

FIG. 6 is a software flowchart setting forth a procedure for performing video bit rate matching according to a preferred embodiment disclosed herein. The operations set forth in the flowchart may be implemented using the hardware previously described in connection with FIG. 1, wherein the functioning of rate control 113 circuit was disclosed. As shown in FIG. 6, the video bit rate matching procedure consists of six steps. The first step is initialization 600, followed by macro block processing 601, macro block parameter updating 602, and macro block counting 603. At block 603, a test is performed to ascertain whether or not the number of macro blocks that have already been processed are greater than a maximum number of macro blocks. If not, the program loops back to block 601. If so, the program progresses to block 604, where frame parameters are updated. Next, at block 605, frames are counted, and a test is performed to ascertain whether or not there are additional frames to consider. If so, the program loops back to block 601. If not, the program ends.

Referring to block 600, in the initialization stage, the rate control unit 113 (FIG. 1) performs the following series of operations:

1. Obtaining a value for the desired video output bit rate. This value may be received, for example, from one or more endpoint devices;

2. Specifying the maximum output frame rate based upon the desired video output bit rate;

3. Sending the maximum output frame rate to one or more endpoint devices; i.e., sender endpoint devices—which are to be used to send video information to other endpoint devices. Once the sender endpoint device receives the maximum output frame rate, this endpoint device is forced to encode video signals with the specified maximum frame rate.

4. Computing the average number of bits per frame and stores this number in a memory location designated as average_bits_per_frame. If the desired video output bit rate is $R_{out}$ and the maximum frame rate is $F_{out}$, then the $$\text{average\_bits\_per\_frame} = \frac{R_{out}}{F_{out}}.$$

5. Initializing the transmission buffer with an initial buffer fullness specified as $B_0$.

6. Specifying the targeted_bits_per_frame for the 1st frame.

$$\text{targeted\_bits\_per\_frame} = K * \frac{R_{out}}{F_{out}}$$

where K is a constant which is chosen based on the maximum frame rate and the initial buffer fullness $B_0$. Then the targeted_bits_per_mblk is $$\text{targeted\_bits\_per\_mblk} = \frac{\text{targeted\_bits\_per\_frame}}{\text{total\_number\_of\_mblk}}$$

7. According to the targeted_bits_per_mblk, specifying the particular group indices which are to be set to zero.

At the macro block processing step (FIG. 6, block 601), the DCT coefficients processor 107 (FIG. 1) performs the following steps:

1. Receiving a macro block from the VMD 104 (FIG. 1);
2. Receiving a control signal over signal line 114 from rate control 113 circuit in the control signal specifies one or more DCT coefficients to be set to zero; and
3. Setting the DCT coefficients specified by the control signal to zero.

After processing one macro block, the rate control 113 circuit receives the new buffer status from transmission buffer 111 via first input/output 112. The rate control 113 circuit uses the buffer status, defined above, to update the control signal. Since the transmission buffer 111 is used as a temporary storage facility for video information, the buffer may operate in a first state, where the buffer is in the process of receiving new video information from input buffer 110, or the buffer may operate in a second state, where the buffer has already stored incoming video information and is adapted to output this information to buffer output 116. Therefore, the status of the buffer refers to the state in which the buffer is operating at a given moment.

The steps implemented by rate control circuit 113 for updating the control signal include:

1. Obtaining the total number of bits used for the mblk, bits_per_mblk;
2. Computing the difference between the targeted_bits_per_mblk and the actual bits_per_mblk.

bits_difference+=targeted_bits_per_mblk-bits_per_mblk.

3. Updating the control signal on signal line 114 based on the following:

If difference>0, reduce the number of indices to be set to zero.

else if difference<0, increase the number of indices to be set to zero.

else no change.

At the end of processing each macro block, the macro block counter is checked against the total number of mblk to ascertain whether or not a frame is finished. If a frame is finished, rate control 113 circuit starts updating the frame parameters. At block 604, the rate control 113 circuit performs the following series of operations:

1. Obtaining the transmission buffer 111 status;
2. Obtaining the total number of bits used in the frame;
3 Based on the targeted memory location occupancy rate for transmission buffer 111 (i.e., buffer fullness), computing the targeted bits for the next frame and the targeted bits for each macro block;
4 Based on the targeted bits for each macro block, providing an appropriate control signal for the 1st macro block of the next frame.

After frame parameter updating, the new frame is checked. If there are no more bits, then the procedure ends. Otherwise, the procedure reverts back to processing macro blocks.

A second method of video bit rate matching is the requantization of DCT coefficients. The output signal at the first output 105 of VMD 104 includes two components: quantized DCT coefficients, and a quantization parameter. In order to determine values for the DCT coefficients, an inverse quantization operation is performed on the quantized DCT coefficients as follows. Let $\{x_i, i=0,1,2,\ldots 63\}$ be the quantized DCT coefficients and $\{y_i, i=0, 1, \ldots 63\}$ be the reconstructed DCT coefficients, with Qp representing the quantization parameter. Then, with respect to an H.261-like environment, in the I-coding mode, the reconstructed DC coefficient $y_0$ is calculated using the relationship $$y_0 = x_0 * 8,$$

and the remaining coefficients are calculated using the formula $$y_i = [x_i * 2 + \sin(x_i)] * Qp.$$

where $\{i=1, 2, \ldots 63\}$ in I mode and $\{i=0, 1, \ldots 63\}$ in P mode, and the sign(w) function is defined as follows:

$$\text{sign}(w) = \begin{cases} 1 & \text{if } w \geq 0 \\ -1 & \text{if } w < 0 \end{cases}$$

To control the amount of data produced by the DCT coefficients processor 107 (FIG. 1), the rate-control unit computes the proper quantization parameter $Qp_{new}$ based on the targeted bits per macro block and sends it to the DCT coefficients processor 107 to requantize the DCT coefficients. Let $\{z_i, i=0,1,\ldots 63\}$ be the new quantized DCT coefficients, and $QP_{new}$ be the new quantization parameter obtained from the rate control 113 circuit. Then, the new quantized DCT coefficients are determined by $$z_0 = (y_0 + 4)/8,$$

where $z_0$ is the DC coefficient of the I-coded macro block. The rest of the coefficients are obtained by $$z_i = y_i / (2 * Qp_{new})$$

where $\{i=1, \ldots 63\}$ for the intra-coded macro block, and $\{i=0,1,\ldots, 63\}$ for inter-coded macro blocks.

With respect to the second method of matching video signal bit rates, the sequence of operations performed by the hardware configuration of FIG. 1 is virtually identical to the process set forth in FIG. 6, with the following exceptions. Referring back to FIG. 6, at the initialization stage (block 600), the rate control 113 circuit performs the following steps:

1. Obtaining the new (desired and/or target) video output bit rate;
2. According to the new video output bit rate, specifying the maximum output frame rate;
3. Sending the maximum frame rate via communications line 115 to the sender endpoint device (defined above) to force this endpoint to encode the video with the maximum frame rate.
4. Computing the average number of bits per frame as average_bits_per_frame. Let new video bit rate be $R_{out}$ and the maximum frame rate be $F_{out}$, then the $$\text{average\_bits\_per\_frame} = \frac{R_{out}}{F_{out}}.$$

5. Initializing the transmission buffer with an initial buffer memory occupancy rate (fullness) of $B_0$.
6. Specifying the targeted_bits_per_frame for the 1st frame.

$$\text{targeted\_bits\_per\_frame} = K * \frac{R_{out}}{F_{out}}$$

where K is a constant which is chosen based on the maximum frame rate and the initial buffer fullness $B_0$. Then the targeted_bits_per_mblk is $$\text{targeted\_bits\_per\_mblk} = \frac{\text{targeted\_bits\_per\_frame}}{\text{total\_number\_of\_mblk}}$$

7. According to the targeted_bits_per_mblk, specify the new quantization parameter $Qp_{new}$.

At the macro block processing step (block 601), the DCT coefficients processor 107 performs the following steps:

1. Obtaining an mblk from the VMD 104;
2. Performing inverse quantization based on the Qp and recovering the DCT coefficients;
3. Obtaining the control signal on signal line 114 from rate control 113 circuit;
4. Using the control signal on signal line 114, requantizing the DCT coefficients.

After the processing of one macro block has been completed, the rate control 113 circuit 113 obtains the new (current) transmission buffer 111 status and updates the control signal on signal line 114. The steps implemented by rate control 113 circuit include:

1. Obtaining the total number of bits used for the macro block, bits_per_mblk;
2. Computing the difference between the targeted_bits_per_mblk and the actual bits_per_mblk:

bits_difference+=targeted_bits_per_mblk-bits_per_mblk.

3. Updating the control signal 114 based on the following:

If difference>0, reduce the size of the quantization parameter; else if difference<0, increase the size of the quantization parameter; else no change.

At the end of processing each macro block, a macro block counter which counts the number of macro blocks which have been processed, is checked against the total number of macro blocks to ascertain whether or not a frame has been completed. If a frame has been completed, rate control 113 circuit commences updating the frame parameters. At block 604, the rate control 113 circuit performs the following steps:

1. Obtaining the transmission buffer 111 status;
2. Obtaining the total bits used by the frame;
3. Based upon the targeted buffer fullness (memory location occupancy rate), computing the targeted bits for the next frame and the targeted bits for each macro block;
4. Based on the targeted bits for each macro block, generating an appropriate control signal for the first macro block of the next frame.

After frame parameter updating, the new frame is checked. If there are no more bits, then the procedure ends. Otherwise, the procedure reverts back to the macro block processing step at block 601.

A third method of video bit rate matching may be employed in conjunction with a preferred embodiment disclosed herein. This third method includes all methods which represent combinations of various features of the first and second methods. The manner in which the first and second methods are combined is determined by the specific applications of a given system. One illustrative combination of the first and second methods is the process of using DCT coefficient partitioning to process intra-coded macro blocks, and then employing requantization to process the inter-coded macro blocks.

Although system 100 (FIG. 1) with the DCT processor equipped for implementing the three different processing schemes described above is satisfactory for lower rate reduction and intra-coded frames, there is a mismatch, "drift" between an endpoint device that transmits video information at a fast rate relative to other endpoint devices which decode this video information at a slower rate. This mismatch is brought about because the video encoder is required to operate at a faster bit rate than the video decoder. This mismatch exists for all the inter-coded frames and is likely to accumulate with time, unless an intra-coded frame is periodically inserted into the video bit stream. To control the accumulation of the mismatch, an improved DCT processor with the mismatch correction elements is shown in FIG. 7.

Figure 7:
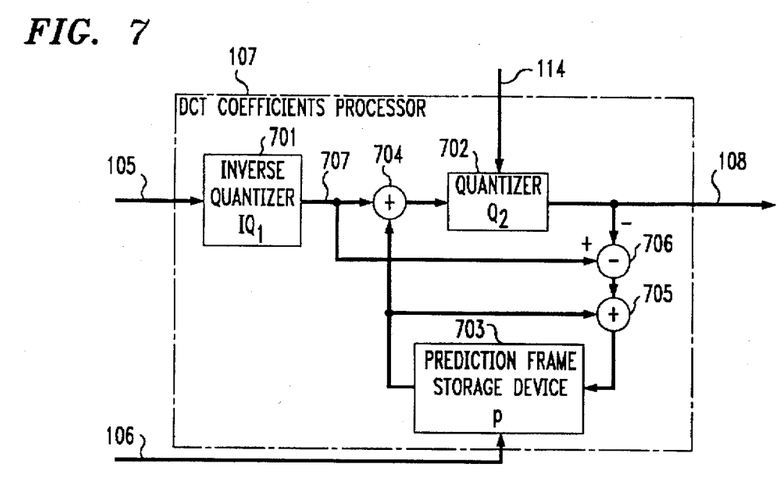
FIG. 7 is a hardware block diagram setting forth an illustrative structure for the discrete cosine transformation (DCT) processor of FIG. 1.

FIG. 7 is a hardware block diagram setting forth an illustrative structure for the discrete cosine transformation (DCT) processor of FIG. 1. The hardware configuration of FIG. 7 represents an improvement over the DCT coefficient processor disclosed before in connection with FIG. 1, as well as other existing state of the art systems, such as the systems described in an ITU-T document entitled, "Low Bitrate Coding (LBC) for Videophone", document no. LBC-94-166. This document describes methods for reducing the bit rate of compressed video information with a minimal amount of associated processing delays. One implementation described in the ITU document utilizes one motion-compensated prediction storage device and two transform operations: a forward transform operation, and an inverse transform operation. The main purpose of this implementation is to correct the "drift", i.e., the mismatch, between a video encoder and a video decoder.

According to a preferred embodiment disclosed herein, the two transform operations described in the preceding paragraph are no longer required. Rather, motion compensation is performed in the transform domain, as the terms "motion compensation" and "transfer domain" are generally understood by those skilled in the art. With reference to FIG. 7, one feature of this embodiment is that the drift error signal stored in a picture memory of a prediction frame storage device 703 need not be stored with full accuracy. In particular, only a small number of the lower-frequency components of the transform coefficients need to be retained in the picture memory. Since only a relatively small number of coefficients are now involved in the motion compensation process, and the transform operations are no longer needed, implementation of the embodiments disclosed herein is simplified considerably over the system described in the above-referenced ITU-T document identified as no. LBC-94-166.

The simplified system disclosed herein is described below with reference to FIG. 7. An improved DCT (discrete cosine transformation) processor 107 is shown, which includes an inverse quantizer 701, a quantizer 702, and a prediction frame storage device 703. The inverse quantizer 701 accepts DCT coefficients and quantization parameters of an input bit stream from the first output 105 of VMD 104 (FIG. 1). The output of inverse quantizer 701 which is the reconstructed DCT coefficient, is coupled to a first input of a summer 704, and this output is also coupled to a first input of a subtractor 706. The output of summer 704 is fed to a first input of quantizer 702. A second input of quantizer 702 is under control of the signal line 114 which is coupled to rate control 113 circuit (FIG. 1).

The output of quantizer 702 (FIG. 7) which is the re-quantized DCT coefficient 108, is fed to a second input of subtractor 706. The output of subtractor 706, which is the difference between output 707 and output 108, representing the DCT coefficients of the error signals; i.e., "drift" signal, is connected to a first input of summer 705. The output of summer 705 is coupled to a first input of prediction frame memory storage device 703, and a second input of prediction frame memory storage device 703 is connected to the second output of VMD 104 (FIG. 1). The output of prediction frame storage device 703 is fed to a second input of summer 704 and this output is also fed to a second input of summer 705.

Inverse quantizer 701, quantizer 702, summers 704, 705, and subtractor 706 are system components which are well-known to those skilled in the art. Conventional components may be used for these items. With respect to the prediction frame storage device 703, this device includes a video buffer for storing information corresponding to one or more video frames, a random-access memory device, and a microprocessor for controlling the operation of the buffer and the random-access memory. The microprocessor is equipped to execute a software program adapted to perform the steps outlined below in connection with the prediction frame storage device 703.

The hardware configuration of FIG. 7 operates as follows. Assume that the quantized DCT coefficients of an input video bit stream having a bit rate of R1 passes from the first output 105 of VMD 104 (FIG. 1) to the input of inverse quantizer 701 (FIG. 7). At inverse quantizer 701, the quantified DCT coefficients are re-constructed to produce the DCT coefficients. The DCT coefficients plus the DCT coefficients of the "drift" error are sent to DCT coefficient processor 107. One purpose of DCT coefficients processor 107 (FIGS. 1 and 7) is to generate an output signal representing the processed coefficients. When the DCT coefficients processor 107 is initially started up, there is no drift error between output 707 and output 108 (FIG. 7). Therefore, upon initial startup, inverse quantizer 701 provides an output signal including reconstructed DCT coefficients, and this signal passes unchanged through summer 704, to quantizer 702.

The operation of quantizer 702 is controlled by a signal on signal line 114 from the rate control 113 circuit (FIG. 1), so as to provide a signal having the desired output bit rate at the output of the bit rate matching system of FIG. 1. The output of this bit rate matching system may be provided from the transmission buffer 111 (FIG. 1). Note that the output of quantizer 702 (FIG. 7) represents the DCT coefficients processor output 108. This output 108 is then recoded and multiplexed with motion vectors and quantization information by VME 109 (FIG. 1). The VME 109 may then send the recoded, multiplexed signal to transmission buffer 111. The signal is stored in the transmission buffer 111 prior to transmission at the desired output bit rate. The fullness, or buffer memory location occupancy ratio, of transmission buffer 111 is used to control the quantization levels for quantizer 702.

Next, assume that the output of inverse quantizer 701 does not equal the output of quantizer 702. The output 707 of inverse quantizer 701 will be denoted as "A", and the output 108 of quantizer 702 will be denoted as "B". Thus, an error of B−A is added to the picture data. This error, denoted as Ed, is subtracted from the picture data by the system of FIG. 7. At initial startup, Ed is zero, and the data pass unchanged through summer 705 to the prediction frame storage device 703. Typically, only a small number of low-frequency coefficients are fed to subtractor 706, and thus, Ed is only an approximation of the actual drift error due to requantization. During recoding of the next video frame, Ed is approximately equal to the drift error of the previous frame.

During motion-compensated prediction, prediction frame storage device 703 uses motion vectors on the second output 106 of VMD 104 (FIG. 1) to output a displaced drift error signal. As the prediction is performed directly in the DCT domain, the output of the prediction frame storage device 703 representing the displaced drift error signal, is represented by its DCT coefficients.

To compute the displaced drift error directly in the DCT domain, the following operations are performed by the prediction frame storage device 703. Since the motion vector 106 represents an arbitrary number of pels, and the DCT representation of the reference frame stored in prediction frame storage device 703 are grouped into a block-based format, the motion compensated optimal block may overlay with four neighboring blocks in the DCT block structure.

Let $D_1$, $D_2$, $D_3$, $D_4$ be the four neighboring (adjoining) blocks in the reference frame, and PMC error be the DCT representation of the displaced drift error block. Then $$D_{mc-error} = \sum_{i=1}^{4} G_{h'z} D_z G_{wz}$$

where $G_h$, $G_w$ are the DCT representations of the spatial sparse $H_n$ and $H_w$ matrices of the form:

$$H_n = \begin{bmatrix} O & O \\ I_n & O \end{bmatrix} H_w = \begin{bmatrix} O & I_w \\ O & O \end{bmatrix}$$

where h and w represent overlay width.

The $G_{hz}$ and $G_w$ can be precomputed and stored in prediction frame storage device 703. As the drift error signal contains a lot of zeroes, the required computation is greatly reduced. Further, if motion vectors are zero, or integer multiples of the block width, the above block adjustment procedure can be avoided. This drift error signal will be seen at the DCT coefficients processor output 108, and at transmission buffer 111 (FIG. 1) which receives bits at the desired output bit rate. Without correction, this drift error will accumulate over time and eventually result in unacceptable system performance. In order to ameliorate the problem of drift error accumulation, the previous frame motion compensated drift error Ed is added to the present frame signal (output 707) prior to requantization by quantizer 702. If quantizer 702 introduced very little error, this would completely correct the drift error accumulation problem. However, since quantizer 702 introduces a finite amount of error, the drift can only be partially corrected, and the output of subtractor 706 will not, in general, be zero. Thus, summer 705 adds the drift error from the current frame to the approximate accumulated drift error from previous frames to produce an approximate accumulated drift error Ed for the current frame.

The prediction frame storage device 703 only has to compute a small number (i.e., N) of compensated coefficients. Note that, for intra-blocks of video data, the prediction frame storage device 703 is programmed to set Ed to zero. The relatively small number of computations required to implement the methods disclosed herein is vastly reduced as contrasted with the relatively large number of computations required to perform existing processes using pel domain motion compensation. An additional advantage of the disclosed methods is that these methods require much less memory space than existing prior art methods.

The video transmission rate reduction system shown in FIG. 1 can be implemented, for example, by using a general-purpose microprocessor, a digital signal processor (such as an AT&T DSP 3210 or an AT&T DSP 1610), and/or a programmable video processing chip (such as an integrated circuit known to those skilled in the art as the ITT VCP chip).

Multimedia System Using Video Processing of the Present Invention

Figure 8:
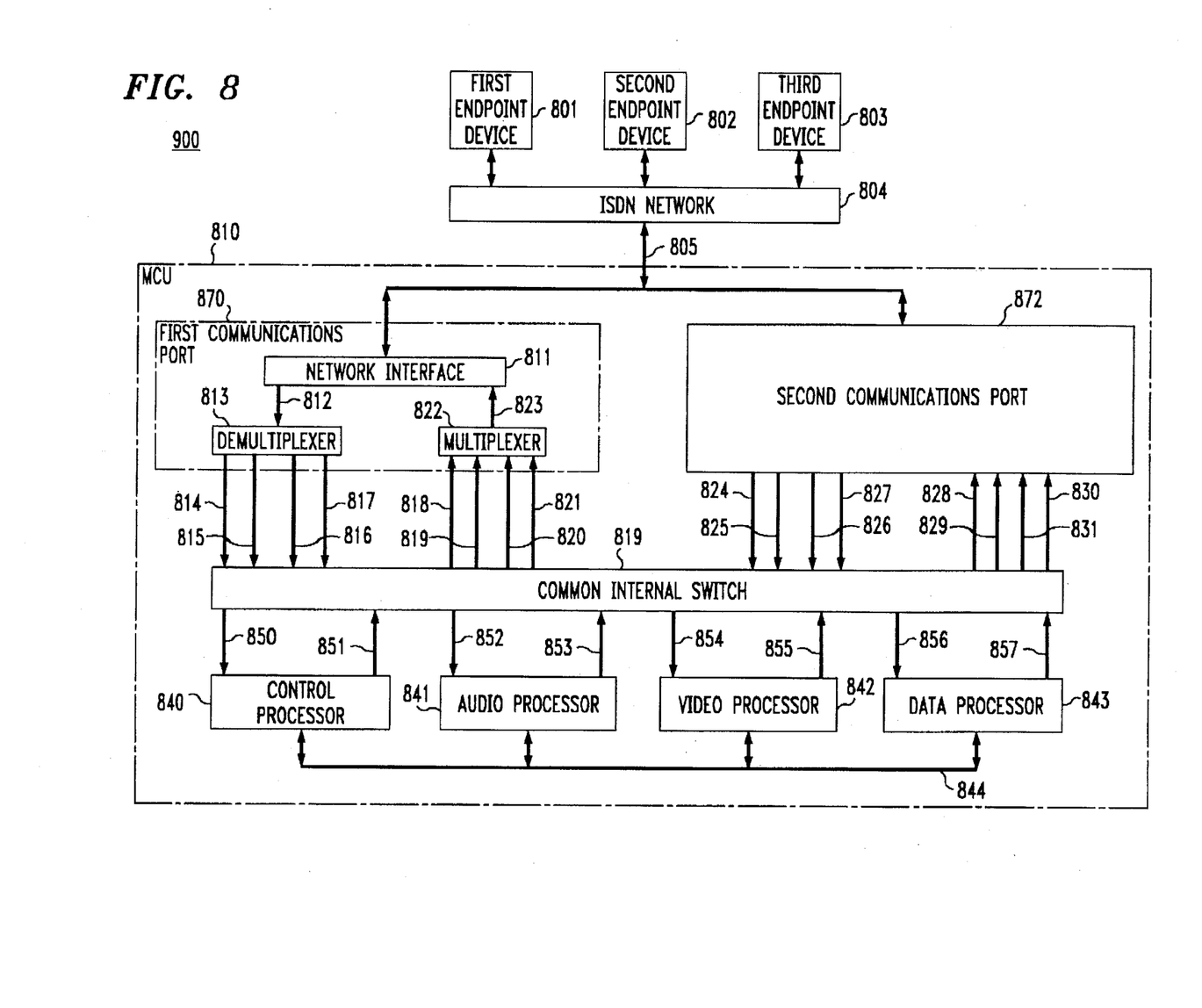
FIG. 8 is a hardware block diagram setting forth the system architecture of a multimedia conferencing system which includes an MCU having a video processor equipped to perform video transmission rate matching methods according to various preferred embodiments disclosed herein.

To illustrate various typical applications for the present invention in the context of multimedia conferencing, FIG. 8 shows a multimedia system using a video processor embodying the bit stream rate matching techniques disclosed herein. Referring now to FIG. 8, a block diagram setting forth the system architecture of a multimedia conferencing system 800 is shown. The conferencing system includes an MCU 810, an ISDN network 804, and a plurality of endpoint devices such as first endpoint device 801, second endpoint device 802, and third endpoint device 803.

Endpoint devices 801, 802, and 803 are coupled to MCU 810 via ISDN network 804. These endpoint devices 801, 802, and 803 may include one or more user interface devices. Each interface device includes either an input means, an output means, or an input means combined with an output means. Output means are adapted to convert multimedia electronic signals representing audio, video, or data into actual audio, video, or data. Input means are adapted to accept audio, video, and/or data inputs, and to convert these inputs into electronic signals representing audio, video, and/or data. Examples of user interface devices include video display, keyboards, microphones, speakers, and video cameras, or the like.

Endpoint devices 801, 802, and 803 are adapted to communicate using existing multimedia communication protocols such as ISDN. The endpoint device multimedia communication protocol controls the presentation of media streams (electronic signals representing audio, video, and/or data information) to the endpoint device user. Endpoint devices may function bi-directionally, both sending and receiving multimedia information, or, alternatively, endpoint devices may function uni-directional, receiving but not sending multimedia information, or sending but not receiving multimedia information.

An example of a suitable endpoint device is an ITU-T H.320 audiovisual terminal, but any device capable of terminating a digital multimedia stream and presenting it to the user constitutes an endpoint device. A particular product example of an H.320-compatible endpoint is the AT&T-GIS Vistium.

MCU 810 is a computer-controlled device which includes a multiplicity of communications ports, such as first communications port 870 and second communications port 872, which may be selectively interconnected in a variety of ways to provide communication among a group of endpoint devices 801, 802, 803. Although the system of FIG. 8 shows two communications ports, this is done for illustrative purposes, as any convenient number of communications ports may be employed. MCU 810 also includes a control processor 840, an audio processor 841, a video processor 842, a data processor 843, and a common internal switch 819. Each communications port includes a network interface, a demultiplexer, and a multiplexer. For example, first communications port 870 includes network interface 811, demultiplexer 813, and multiplexer 822.

Although MCU 810 is shown with two communications ports 870, 872 for purposes of illustration, MCU 810 may, in fact, include any convenient number of communications ports. For an MCU 810 having N ports, there are N network interfaces, one control processor, one audio processor, one video processor, and one data processor. For each processor, there are N input signals coming from N demultiplexers and N output signals going to the N multiplexers. Therefore, MCU 810 may be conceptualized as an N-port MCU where only two communications ports 870, 872 are explicitly shown.

As shown in FIG. 8, first communications port 870 includes network interface 811, demultiplexer 813, and multiplexer 812. Network interface 811 is a circuit which provides the conversion function between the standard line signal coding used by ISDN network 804 and the Px64 kbps H.221 signal used by MCU 810. Network interface 811 includes output port 812, which is adapted to provide an output in the form of an H.221 signal. The H.221 signal is actually a multiplex of several different types of information (audio, video, data, control); therefore, network interface 811 must send the incoming MCU H.221 signal to a demultiplexing device such as demultiplexer 813. Likewise, network interface 811 has an input port 823 adapted to receive an H.221 signal from multiplexer 822. Multiplexer 822 combines a plurality of individually-processed signals which are to be transmitted to a particular endpoint device.

Demultiplexer 813 separates an incoming multimedia signal stream received from network interface 811 into four components: a first component 814, comprising electronic signals representing control; a second component 815, comprising electronic signals representing audio; a third component 816, comprising electronic signals representing video; and a fourth component 817, representing data. The first, second, third, and fourth components 814, 815, 816, 817 represent outputs of demultiplexer 813 which are coupled to common internal switch 819.

Multiplexer 822 accepts a plurality of incoming multimedia signal components from common internal switch 819, such as a first component 818 representing control, a second component 891 representing audio, a third component 820 representing video, and a fourth component 821 representing data. The multiplexer 822 integrates the first, second, third, and fourth components 818, 891, 820, 821 onto a single multimedia signal stream which is coupled to network interface 811. This single multimedia signal stream may be conceptualized as the output of multiplexer 822. The network interface 811 routes this multimedia signal stream to a specific endpoint device 801, 802, 803. For second communications port 872, the four output components are first component 824, representing control, second component 825, representing audio, third component 826, representing video, and fourth component 827, representing data. The four input components to multiplexer 834 are first component 828, representing control, second component 829, representing audio, third component 830, representing video, and fourth component 831, representing data.

Common internal switch 819 contains a plurality of electronic switches, buffers, and/or amplifiers under the control of control processor 840. Common internal switch 819 is coupled to audio processor 841 for mixing and switching electronic signals representing audio; common internal switch 819 is also coupled to video processor 842 and data processor 843 for mixing and switching electronic signals representing video and data, respectively. Therefore, common internal switch 819 effectively receives four output components from each communications port 870, 872 and routes these output components to selected ones of respective processors (control processor 840, audio processor 841, video processor 842, and/or data processor 843) within MCU 810. Likewise, common internal switch 819 receives the output components of each processor in MCU 810 and routes these outputs to the multiplexer 822 of each communications port 870.

Common internal switch 819 receives output control signals from control processor 840 over signal line 851, and provides input control signals to control processor 840 over signal line 850. Common internal switch 819 receives output audio signals from audio processor 841 over signal line 853, and provides input audio signals to audio processor 841 over signal line 852. Common internal switch 819 receives output video signals from video processor 842 over signal line 855, and provides input video signals to video processor 842 over signal line 854. Common internal switch 819 receives output data signals from data processor 843 over signal line 857, and provides input data signals to data processor 843 over signal line 856. Control processor 840 provides control signals to the audio processor 841, video processor 842, and data processor 843 over signal line 844.

ISDN network 804 is connected to MCU 810 over signal line 805. Within MCU 810, signal line 805 is parallel-connected to first and second communications ports 870, 872. For example, in the case of first communications port 870, signal line 805 is connected to network interface 811. Network interface 811 is coupled to demultiplexer 813 over signal line 812, and this network interface 811 is also coupled to multiplexer 822 over signal line 823. Signal line 812 is coupled to the input terminal of demultiplexer 813, and signal line 823 is coupled to the output terminal of multiplexer 822.

Audio processor 841 includes software and hardware for processing audio signals. The processing may take the form of switching the audio, mixing the audio, or both. In the case of audio mixing, the input signal to audio processor 841 is an aggregate audio signal consisting of each of the audio output signals from all of the communications ports 870, 872 of MCU 810. For an N-port MCU 810, this signal includes the N audio signals from the demultiplexers within each communications port 870, 872.

To mix the audio, audio processor 841 decodes each of the audio inputs, linearly adds the signals obtained by decoding, and then re-encodes the linear sum. For each endpoint device, this linear sum may be subjected to additional processing steps, so as to provide each endpoint device with audio information specific to that endpoint device. These additional processing steps may include, for example, any of the following: the output sum for a given endpoint device may exclude that endpoint's input; the sum may include inputs whose present or recent past values exceed a certain threshold; or the sum may be controlled from a specially-designated endpoint device used by a person termed the "chair", thereby providing a feature generally known as chair-control. Therefore, the output of the audio processor 841 is in the form of N processed audio signals.

In the case of audio switching, the input signal to audio processor 841 is a single audio signal which is selected from a given communications port 870 or 872, based upon control signals received from control processor 840. No audio processing is implemented in the present example which involves only audio switching. The audio input is broadcast to all other audio processor 841 outputs, either automatically or under manual control.

Data processor 843 includes hardware and software means for implementing one or both of the functions generally known to those skilled in the art as "broadcast" or "MLP". For each type of broadcast data, data input is accepted from only one endpoint device at any one time. Therefore, the input signal to data processor 843 is the data output from one of the communications ports 870, 872. This data output is broadcast to the other endpoint devices as determined by control processor 840, according to the capabilities of specific endpoint devices to receive such data, as set forth in the capability codes stored in memory units (RAM or ROM) of respective endpoint devices.

Control processor 840 is responsible for determining the correct routing, mixing, switching, format and timing of the audio, video, data and control signals throughout a multimedia conference. The control processor 840 retrieves one or more capability codes from each endpoint device. Capability codes, which are stored in endpoint device RAM and/or ROM, specify the audio, video, data, and/or control capabilities for this endpoint device. Control processor 840 retrieves the capability codes from all N endpoint devices participating in a multimedia conference. These capability codes are stored in a memory unit (RAM) of MCU 810 so that control processor 840 can correctly manage the conference for all endpoint devices. This storage may occur, for example, in a random-access memory (RAM) device associated with control processor 840. In turn, MCU 810 sends the capability codes to each of the N communications ports 870, 872 so that each of the endpoint devices 801, 802, 803 are enabled to communicate with MCU 810 at a bit rate determined by MCU 810 and appropriate for that specific endpoint device 801, 802, 803. To properly control the operations in the video processing unit 842, MCU 810 sends back different capability codes for different video operations. If the endpoints are coupled to MCU 810 via communications links with different transmission rates for switching operation, the minimum transfer rate is adapted in the capability code. The new code is sent to all the endpoint devices participating in the conference to force the endpoint devices to operate with the minimum transfer rate. For performing a transmission rate matching operation, instead of adapting the minimum transfer rate, a new maximum frame rate is specified in the capability code based on all the different transfer rates. The new capability codes, which include the specified maximum frame rates, are sent back to all the endpoint devices. In this case, the video bitstreams generated by the endpoint devices will have different transfer rates but the same frame rate.

Control processor 840 receives inputs which are entered by conference participants into the user interface of an endpoint device 801, 802, 803. These inputs are in the form of chair-control commands and commands embedded in bit streams conforming to the H.221 standard. Commands from endpoint devices are routed to the control processor 840 to ensure the correct distribution of bit streams to the audio, video, and data processors 841, 842, 843, respectively, to ensure that the correct audio decoding algorithm is used at the inputs to an audio mixer within audio processor 841, and to ensure that any incoming data is sent to a data broadcast unit or MLP processor within data processor 843.

The control processor 840 also directs the switching of the bit streams from the audio, video, and data processors 841, 842, 843, respectively, to each multiplexer 822, 834, and specifies the audio encoding algorithm used in the audio mixer of audio processor 841, and the algorithm used at each output from the audio mixer. The bit streams are routed to and from the various processors 841, 842, 843 by the common internal switch 819, which is under control of the control processor 840.

Video processor 842 processes the video signals received from the common internal switch 819. The processing may take the form of switching the video, or matching the video bit rate. In video switching, the video processor 842 receives one selected video signal from the switch 819, and transmits the video signal to some or all other endpoint devices participating in a given multimedia conference. Video selection may be automatic or under manual control. For instance, the audio processor 841 and the video processor 842 may be automatically controlled by control processor 840, such that an endpoint device with currently active audio (i.e., an endpoint device used by the "present speaker" which provides an audio signal to MCU 810 above a predetermined audio amplitude threshold) receives the picture of the endpoint device which previously had active audio (i.e., an endpoint device used by the "previous speaker"), while all other endpoint devices receive the picture of the present speaker.

A time delay may be incorporated into the video switching implemented by video processor 842 to avoid excessively frequent video image changes caused by spurious sounds. As in the case of audio switching, video switching may be controlled directly from a specially-designated endpoint device used by a person termed the "chair". If the delay in the video processor 842 and the delay in the audio processor 841 differ by a significant (humanly perceptible) amount, a compensating delay may be inserted into the appropriate bit stream to retain lip synchronization.

To match video bit rates, video processor 842 incorporates the video transmission rate matching techniques of the present invention.

With reference to FIG. 9, the hardware configuration of an illustrative stand-alone video processor 842 is shown. This video processor 842 may be employed with the MCU 810 of FIG. 8 or, alternatively, the video processor 842 may exist as a stand-alone unit. Such a stand-alone unit may be used to match bit rates for all types of digital video information. The video processor 842 consists of a video transmission rate reduction unit 100, a bit stuffing unit 200, an input switcher 905, and an output switcher 906. If desired, the input switcher 905 and the output switcher 906 could be combined into a single integrated switcher unit, such as common internal switch 819 (FIG. 8) and, hence, would not be incorporated into video processor 842. The inputs to the video processor 842, are for an N-port MCU, an the N-coded video bit stream obtained from N demultiplexers. The outputs of the system are the N-coded video bit streams which are processed to have different transfer rates. The outputs are the inputs to the N multiplexers. The number of required transmission rate reduction units and bit stuffing units is proportional to the difference in the transmission rates among the various endpoint devices. If there are M different video transfer rates involved in a conference, the video processor 842 needs to incorporate (M−1) bit rate reduction systems and (M−1) bit rate increasing units. In the configuration of FIG. 9, M=2 for illustrative purposes.

Signals produced by video processor 842 are coupled to signal line 844 which is used to convey the control signals which control input switcher 905, output switcher 906, transmission rate reduction unit 100 and bit stuffing unit 200. Input switcher 905 provides N-to-1, N-to-2, and N-to-3 switching capabilities. Similarly, output switcher 906 provides 1-to-N, 2-to-N, and 3-to-N switching capabilities. The switching is controlled by control signals on signal line 844. These control signals are generated by the control processor 840. Control processor 840 has control capabilities for handling different transmission rates among a plurality of endpoint devices.

If the transmission rates among all the endpoint devices are the same, the control signals sent out by control processor 840 over signal line 844 serves to place video processor 842 into a switching mode. In such a case, video processor 842 works as a buffer and switcher, such that the input switcher provides an N-to-1 switch and the output provides an 1-to-(N−1) switch. A direct signal path between input switcher 905 and output switcher 906 is utilized, whereas video transmission rate reduction unit 100 and bit stuffing unit 200 are not used.

Figure 10:
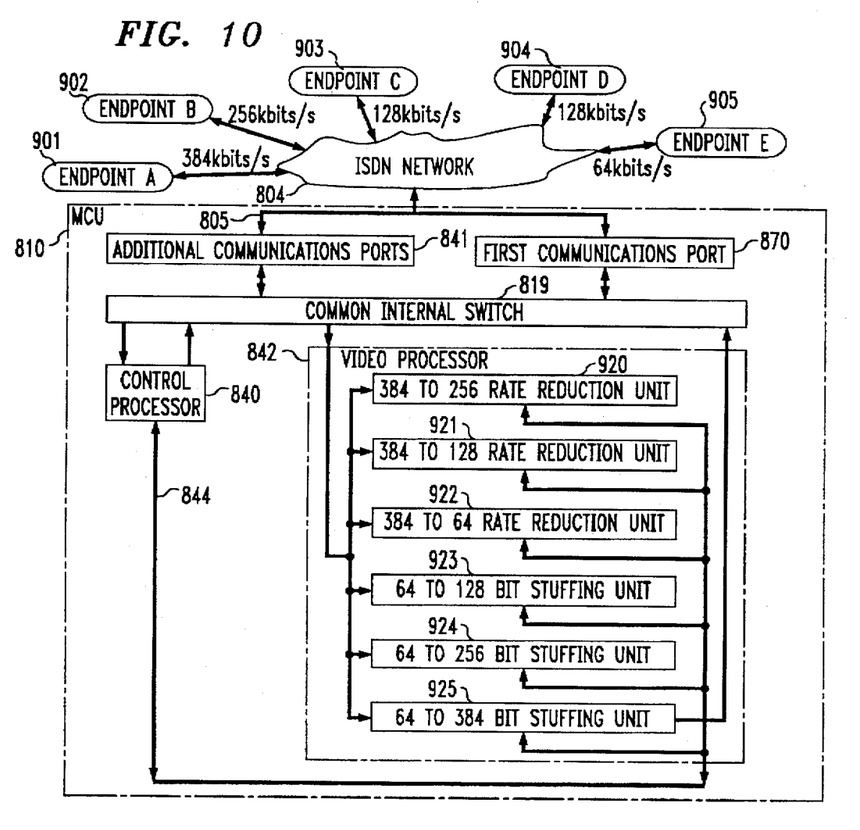
FIG. 10 is a hardware block diagram setting forth a bit rate matching system for use with five endpoint devices.

If the transmission rates among the endpoint devices are different, and if there are more than two different transmission rates among the endpoints, extra rate reduction units 100 and extra bit stuffing units 200 are needed in the video processor 842. As an example, FIG. 10 shows a video transmission bit rate matching system which uses five endpoint devices connected to an ISDN network 804 via a five-point connection wherein the switching functions of video processor 842 are integrated into common internal switch 819. The ISDN network 804 is connected to a five-port MCU 810, including first communications port 840 and additional communications ports 871. A first endpoint device, endpoint A 901, is connected to the ISDN network 804 via a 384 kbits/s communications link. A second endpoint device, endpoint B 902, is connected via a 256 kbits/s link. Third and fourth endpoint devices, endpoint C 903 and endpoint D 904, respectively, are each connected to ISDN network 804 via 128 kbits/s links, and a fifth endpoint device, endpoint E 905, is connected via a 64 kbits/s link. Therefore, the MCU 910 must utilize a video processor 842 having five inputs and five outputs. To produce five outputs with three different transfer rates, the video processor needs three rate reduction units 920, 921, 922, three bit stuffing units 923, 924, 925, and an optional video buffer. The three rate reduction units 920, 921, 922 provide respective rate reductions of 348-to-256 kbits/sec, 384-to-128 kbits/sec, and 384-to-64 kbits/sec. The three bit stuffing units 923, 924, 925 provide respective bit stuffing conversions of 64-to-128 kbits/sec, 64-to-256 kbits/sec, and 64-to-384 kbits/sec.

To provide the proper switching for the inputs and the outputs, the control processor 841 has to provide proper control signals. If endpoint A 901 is used by the current conference speaker and endpoint B 902 is used by the conference speaker who spoke immediately prior to the speaker using endpoint A 901, then the input switcher 305 provides an input switching function wherein 5 inputs are switched to 4 outputs, such that the coded bit stream from endpoint A 901 is switched to any one of the rate reduction units 920, 921, 922 which provide respective bit rate reductions of 384-to-256 kbits/sec, 384-to-128 kbits/sec, and 384-to-64 kbits/sec. To send the picture of the previous speaker to endpoint A 901, the coded bit stream from endpoint B 902 is switched to bit stuffing unit 925, which performs a bit stuffing from a rate of 256 kbits/sec to a rate of 384 kbits/sec. Via the output switcher 306 (FIG. 8), the output of rate reduction unit 920, which performs a bit rate reduction of 384 kbits/sec to 256 kbits/sec, is routed to endpoint B 902, the output of rate reduction unit 921, which performs a rate reduction of 384 kbits/sec to 128 kbits/sec, is routed to endpoints C and D, 903, 904, respectively, and the output of rate reduction unit 922, performing a reduction of 384-to-64 kbits/sec, is routed to endpoint E 905. The output of bit stuffing unit 925 (64-to-384 kbits/sec), is routed to endpoint A 901.

What is claimed:

1. A compressed-domain bit rate reduction apparatus including:

(a) a first inverse quantizer having an input and an output;

(b) a second inverse quantizer having an input and an output;

(c) a prediction frame store;

(d) a quantizer having an input and an output; and (e) first, second, and third summing devices; each summing device having a first input, a second input, and an output;

the first inverse quantizer adapted to accept an input signal including quantized DCT coefficients and quantization parameters, such that an output signal of reconstructed DCT coefficients is generated;

the output signal being coupled to the prediction frame store;

the first inverse quantizer output signal coupled to the first input of the first summing device;

the prediction frame store generating an output signal including a drift error signal; the drift error signal being coupled to the second input of the first summing device;

the output of the first summing device being coupled to the quantizer input; the quantizer output being coupled to the second inverse quantizer input; the second inverse quantizer output being inverted and then coupled to the first input of the second summing device; the first inverse quantizer output being coupled to the second input of the second summing device; the output of the second summing device being coupled to the first input of the third summing device; the second input of the third summing device being coupled to the output signal of the prediction frame store; the output of the third summing device being coupled to the prediction frame store; the output of the quantizer comprising re-quantized DCT coefficients and new quantization parameters.

2. A compressed-domain bit rate reduction system wherein a first compressed video bit stream having a first transfer rate is converted in the compressed domain into a second compressed video bit stream having a second transfer rate slower than the first transfer rate, the system comprising:

(a) a video multiplex decoder for demultiplexing and decoding the first video bit stream to generate (i) quantized DCT coefficient microblocks representing a plurality of digitized frequency components for the first video bit stream, and (ii) header information specifying a starting point for a compressed video image, compressed video image synchronization information, and the location of a given microblock or group of microblocks in the compressed video image;

(b) a DCT coefficients processor for receiving quantized DCT coefficient microblocks from the video multiplex decoder and receiving quantization information from a rate control processor to generate a set of processed DCT coefficient microblocks containing fewer DCT coefficients than the number of coefficients in the quantized DCT coefficient microblocks received from the video multiplex decoder;

(c) a video multiplex encoder for encoding requantized DCT coefficient microblocks obtained from the DCT coefficients processor, and for multiplexing header information with the encoded DCT coefficient microblocks to produce the second compressed video bit stream;

(d) a rate control processor providing control information for the DCT coefficients processor, the rate control processor comprising a processor for generating new quantization information for the DCT coefficients processor according to a transmission buffer status value specifying the number of available bits remaining in a video transmission buffer, and according to a desired bit rate for the second compressed video bit stream, wherein each microblock adjoins another microblock at a microblock boundary, and wherein said DCT coefficients processor further includes:

(a) a first inverse quantizer which, in response to the receipt of the quantized DCT coefficient microblocks and the original quantization information from the video multiplex decoder, produces an output in the form of reconstructed DCT coefficient microblocks according to the quantization information;

(b) a quantizer which accepts the reconstructed DCT coefficient microblocks and a DCT feedback signal to produce requantized DCT coefficient microblocks according to the new quantization information obtained from the rate control processor;

(c) a second inverse quantizer which receives the requantized DCT coefficient microblocks and produces reconstructed DCT coefficients based upon the new quantization information;

(d) a prediction frame storage device which stores at least one frame, each frame including a plurality of DCT coefficient microblocks, and which generates a DCT feedback signal based upon the DCT coefficient microblocks stored in the frame storage device;

(e) a first summing device coupled to the output of the first inverse quantizer, the output of the frame storage device, and the input of the quantizer for adding the output of the first inverse quantizer and the DCT feedback signal from the output of the frame storage device to generate a sum, and applying the sum so generated to the input of the quantizer; and (g) a second summing device coupled to the first inverse quantizer and the second inverse quantizer for subtracting the output of the second inverse quantizer from the output of the first inverse quantizer to generate a DCT error signal.

3. A compressed-domain bit rate reduction system as set forth in claim 2 further including a third summing device coupled to the second summing device and the frame storage device for performing compensation on the DCT error signal, and wherein the second summing device applies the DCT error signal to the input of the third summing device.

4. A compressed-domain bit rate reduction system as set forth in claim 3 wherein the third summing device adds the output of the second summing device to the output of the frame storage device and stores the sum in the frame storage device.

5. A compressed-domain bit rate reduction system as set forth in claim 2 wherein the output of the second summing device is coupled directly to the frame storage device.

6. A compressed-domain bit rate reduction system as set forth in claim 3 wherein the output of the second summing device is coupled directly to the frame storage device, thereby bypassing the third summing device.

7. A compressed-domain bit rate reduction system as set forth in claim 2 wherein, for a set of intra-coded microblocks setting forth DCT coefficients for a current frame of a compressed video image, the DCT error signal from the output of the second summing device is stored in the prediction frame storage device.

8. A compressed-domain bit rate reduction system as set forth in claim 2 wherein, for a set of DCT coefficient microblocks that are intra-coded, the output of the first inverse quantizer is coupled to the input of the quantizer, thereby bypassing the first summing device.

9. A compressed-domain bit rate reduction system as set forth in claim 2 wherein, for a set of DCT coefficient microblocks that are inter-coded, the output of the first inverse quantizer is added to the output of the frame storage device and the sum is applied to the input of the quantizer.

10. A compressed-domain bit rate reduction system as set forth in claims 3, 4, 5, 6, 7, 8, or 9 wherein said DCT coefficients processor further includes:

(a) a first inverse quantizer which, in response to the receipt of the quantized DCT coefficient microblocks and the quantization information from the video multiplex decoder, produces an output in the form of reconstructed DCT coefficient microblocks according to the quantization information;

(b) a quantizer which accepts the reconstructed DCT coefficient microblocks and a DCT feedback signal to produce requantized DCT coefficient microblocks according to the new quantization information obtained from the rate control processor;

(c) a second inverse quantizer which receives the requantized DCT coefficient microblocks and produces reconstructed DCT coefficients based upon the new quantization information;

(d) a prediction frame storage device which stores a frame including a plurality of DCT coefficient microblocks, and which generates a DCT feedback signal based upon the DCT coefficient microblocks stored in the frame storage device;

(e) a first summing device coupled to the output of the first inverse quantizer, the output of the frame storage device, and the input of the quantizer for adding the output of the first inverse quantizer and the DCT feedback signal from the output of the frame storage device to generate a sum, and applying the sum so generated to the input of the quantizer; and (f) a second summing device coupled to the first inverse quantizer and the second inverse quantizer for subtracting the output of the second inverse quantizer from the output of the first inverse quantizer to generate a DCT error signal, and for applying the DCT error signal to the input of a third summing device.

11. A DCT coefficients processor for use in a compressed-domain bit rate reduction system wherein a first set of quantized DCT coefficient microblocks is converted into a second set of quantized DCT coefficient microblocks in the compressed domain, the second set of quantized DCT coefficient microblocks having fewer DCT coefficients than the first set of quantized DCT coefficient microblocks, the DCT coefficients processor comprising a processing device for receiving the first set of quantized DCT coefficient microblocks and quantization information to generate the second set of quantized DCT coefficient microblocks, the DCT coefficients processor further including:

(a) a first inverse quantizer which, in response to the receipt of the quantized DCT coefficient microblocks and the quantization information, produces an output in the form of reconstructed DCT coefficient microblocks according to the quantization information;

(b) a quantizer which accepts the reconstructed DCT coefficient microblocks and a DCT feedback signal to produce requantized DCT coefficient microblocks in response to the receipt of new quantization information;

(c) a second inverse quantizer which receives the requantized DCT coefficient microblocks and produces reconstructed DCT coefficients based upon the new quantization information;

(d) a prediction frame storage device which stores a frame including a plurality of DCT coefficient microblocks, and which generates a DCT feedback signal based upon the DCT coefficient microblocks stored in the prediction frame storage device;

(e) a first summing device coupled to the output of the first inverse quantizer, the output of the frame storage device, and the input of the quantizer for adding the output of the first inverse quantizer and the DCT feedback signal from the output of the frame storage device to generate a sum, and applying the sum so generated to the input of the quantizer; and (f) a second summing device coupled to the first inverse quantizer and the second inverse quantizer for subtracting the output of the second inverse quantizer from the output of the first inverse quantizer to generate a DCT error signal, and for applying the DCT error signal to the input of a third summing device.

* * * * *